INVENTOR
CALVIN W. HUNTER

May 23, 1972 C. W. HUNTER 3,664,534
LATERAL SHUTTLE DEVICE FOR MATERIAL STORAGE SYSTEM
Filed Sept. 2, 1970 2 Sheets-Sheet 2
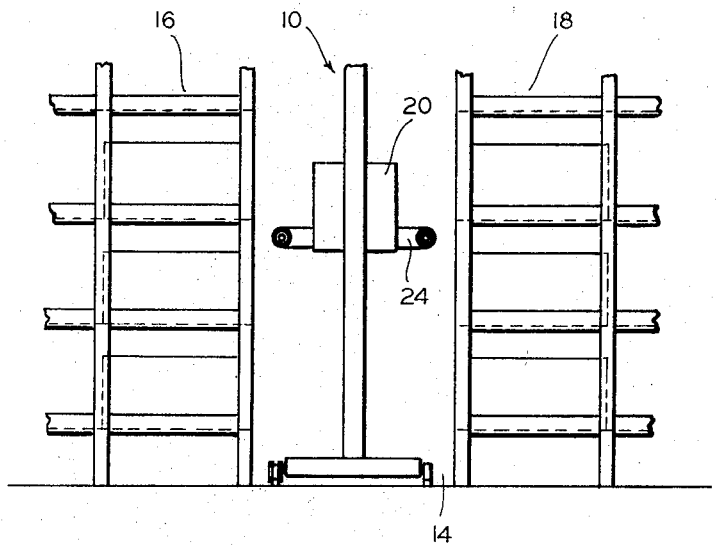
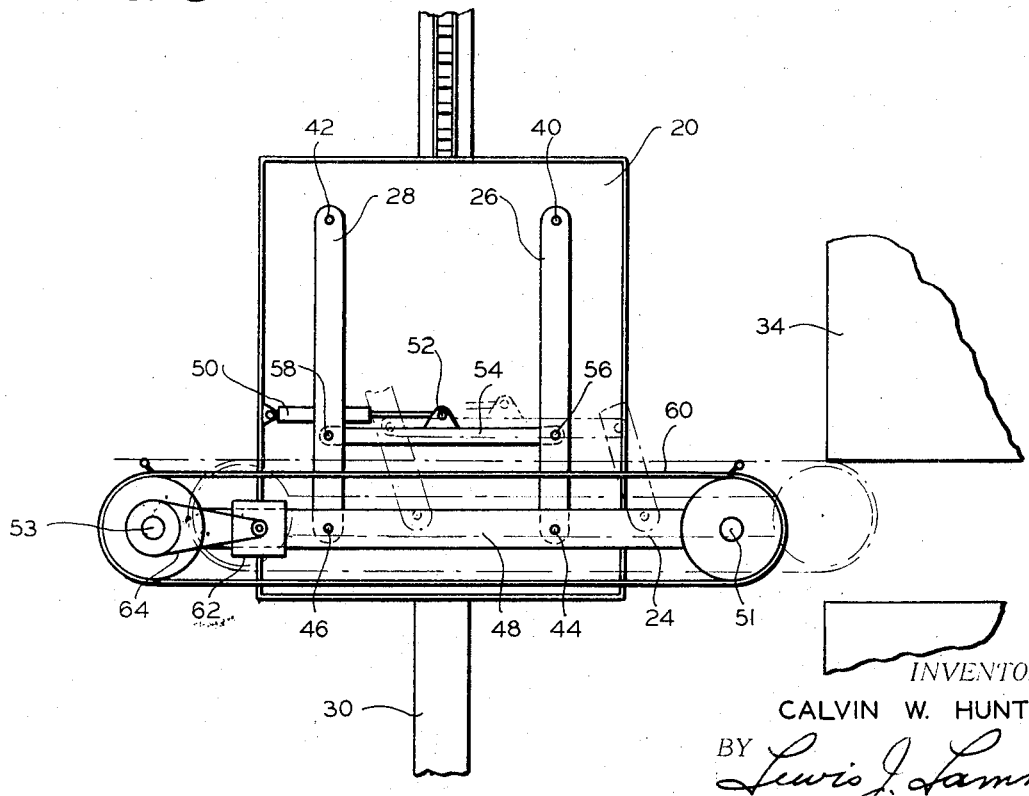
INVENTOR
CALVIN W. HUNTER
BY Lewis J. Lamm
ATTORNEY May 23, 1972  A. M. HAND  3,664,534
FRIEGHT CONTAINER TRANSFER SYSTEM
Filed Dec. 8, 1969  3 Sheets-Sheet 3

INVENTOR.
ALBERT M. HAND
BY
*Leon Arthurs*
Agent

United States Patent Office

3,664,534
Patented May 23, 1972

---

3,664,534
LATERAL SHUTTLE DEVICE FOR MATERIAL STORAGE SYSTEM
Calvin W. Hunter, Battle Creek, Mich., assignor to Clark Equipment Company
Filed Sept. 2, 1970, Ser. No. 69,077
Int. Cl. B66f 9/14
U.S. Cl. 214—730     1 Claim

ABSTRACT OF THE DISCLOSURE

Apparatus for moving material on and off of supports in which the material is conveyed horizontally on a belt conveyor and both horizontally and vertically by swinging the conveyor through an arc.

CROSS REFERENCES TO RELATED APPLICATIONS

Reference is made to copending application Ser. No. 543,229 filed Apr. 18, 1966, now Pat. No. 3,536,209 issued Oct. 27, 1970, in the names of Arthur R. Burch and Charles E. Bates. This prior application discloses a complete automated warehousing system to which the present invention is applicable and in which the present invention offers an improvement of one of the particular portions of the invention covered by the prior application. It will be apparent as the description proceeds that the invention is also applicable to a lift truck or other material handling mechanism used for depositing and withdrawing material units from storage locations such as bins.

BACKGROUND OF THE INVENTION

Previously in the art to which the present invention pertains, and particularly to material handling in the field of automatic warehousing, loads of material have been deposited and withdrawn from selected supports or bins by means of a relatively complex extensible fork or platform mechanism with or without means for moving the load horizontally on the fork or platform. Independent elevating and horizontally moving mechanisms are required to permit the load to be elevated to above its final position then moved horizontally into its position over the bin or support and then lowered into its final postion. These laterally extensible fork or platform mechanisms are adapted to operate in and out and up and down and have sophisticated positioning controls to insure precise predetermined movements.

SUMMARY OF THE INVENTION

In the present invention, the material is placed on a belt or other type conveyor on which the material may be moved horizontally and the conveyor is suspended by an equal arm linkage device which permits the conveyor assembly plus the material to be moved translationally in an arc relative to the support. This permits the support to be moved so as to bring the material to a predetermined position adjacent the final storage support. Then the conveyor system is moved translationally so that the conveyor is lined up at a position slightly above the position of the storage support, but in close proximity thereto. The actuation of the conveyor then permits the material to be moved from the conveyor assembly to the bin by actuating the conveyor belt. The material may be removed from the bin by bringing the conveyor to a fixed position relative to the bin then moving the conveyor translationally until the edge of the belt conveyor is under the material and adjacent the bin in such a position so as to be supporting the edge of the material. Then the actuation of the conveyor removes the material from the bin after which the conveyor assembly is moved translationally into the lower position. The supporting structure may then be moved to carry the conveyor and the material to any desired location.

It is an important object of the present invention to simplify and make less costly, without sacrifice to function or efficiency, apparatus for depositing and withdrawing material to and from storage bins or racks.

It is another object of the present invention to eliminate the use of supporting forks or fixed platforms with their inherent lost time (about 7 seconds) travelling empty into or from a bin.

It is another object of the present invention to permit the use of lower cost bins having supports running parallel with the carrier aisle.

It is another object to reduce the complexity of the equipment required for depositing and removal of material from storage racks or supports.

Other objects and advantages of the present invention will become apparent from reading the detailed description in the specification and appended claims.

BRIEF DESCRIPTION OF THE DRAWING

FIG. 2 is an end elevation view of this storage system;
FIG. 3 shows the details of the present inveniton;

Referring more particularly to the drawing, FIG. 1 shows a material unit stacker 10 mounted on rails 12 for selected and controlled longitudinal movement in the aisle adjacent the bin structure 16. The carriage 10 moves along the aisle on tracks 12 and the support structures 20 and 22 carrying the belt conveyor assembly 24 to linkages 26 and 28 move vertically on supports 30 and 32. The bin structure 16 has supports for material or bin structures 34 and 36 which are supported in spaced relationship with each other by columns 38.

Referring to FIG. 2, the bin structure 18 is similar to bin structure 16, but located on the opposite aisle thereof. The spaced relationship between 16 and 18 is constant throughout the length of the travel of the carriage 10 in the aisle 14.

Referring now to FIG. 3, the supporting structure 20 (to which structure 22 is identical) is supported for vertical movement on 30 (supporting structure 22 moves similarly on column 32). The power driven conveyor 24, here shown as a belt conveyor, is supported from supporting structure 20 and 22 by means of a quadratic linkage including arms 26 and 28 connected to structure 20 and similar arms connected to 22. Structures 20 and 22 are rigidly connected together and is referred to as the supporting structure. The linkage between 22 and the conveyor assembly 24 is identical to that which will be described as between 20 and 24. The pivot arm 26 is supported at the pivot 40 to the structure 20 and the pivot arm 28 is supported to the same structure at the pivot 42. The connecting lengths or arms 26 and 28 are connected to the frame structure 48 of the power driven conveyor 24 at the pivots 44 and 46 respectively. The arms 26 and 28, together with the structure 20, and the support member 48, form a parallelogram with pivots at its four corners so that the distance between 40 and 42 is equal to that between 44 and 46 and the distance between 40 and 44 is equal to that between 42 and 46. Therefore, the conveyor assembly 24 can move translationally with the pivots 44 and 46 forming an arc about 40 and 42 respectively. The parallelogram structure causes the conveyor to remain in a level position as it is moved translationally. This translational movement is power driven by an actuator 50 through a connecting point 52 and an arm 54 having pivot points 56 and 58 connecting it to arms 26 and 28.

Figure 1:
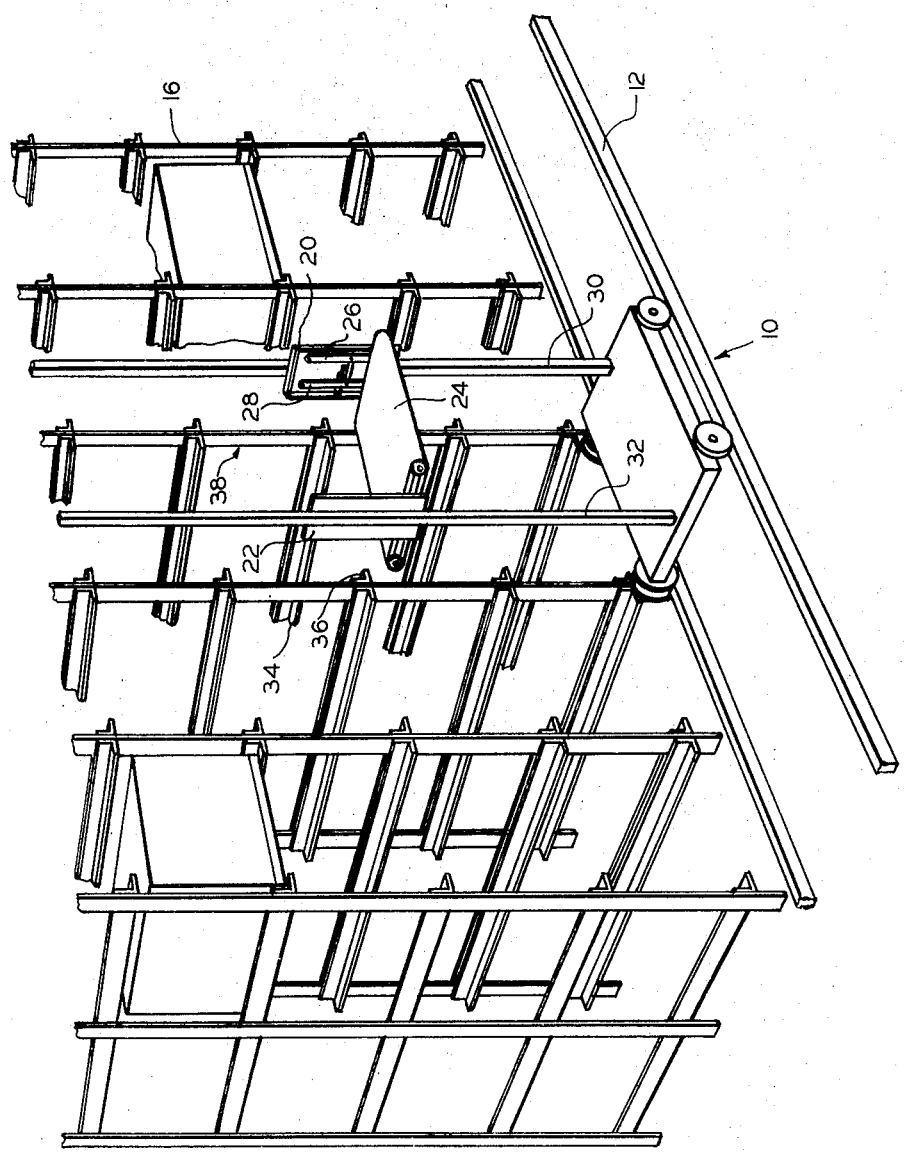
FIG. 1 is an isometric drawing of a storage system in which the present invention could be used.
Figure 6:
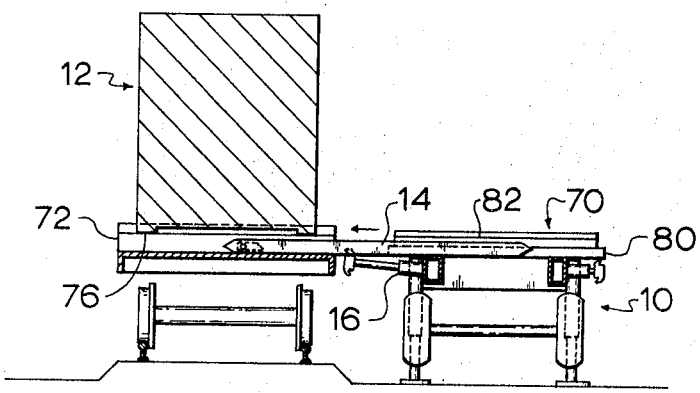
Figure 7:
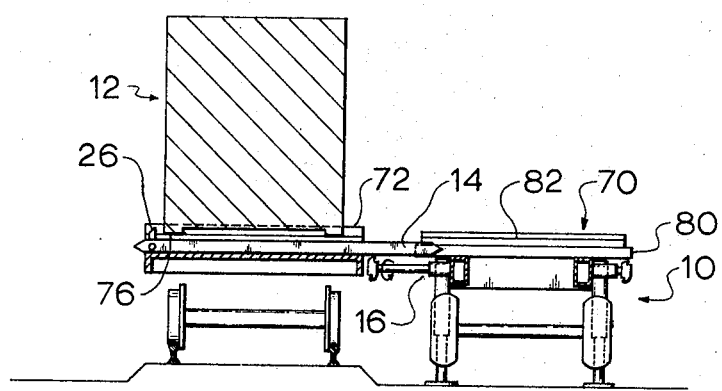
Figure 8:
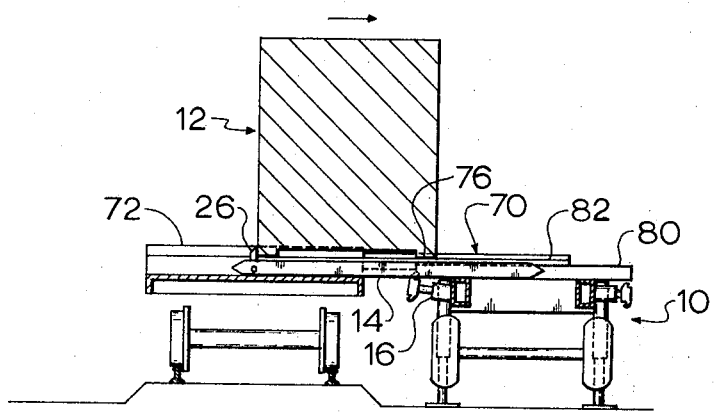

The power driven conveyor 24 is here shown as a belt conveyor having a belt 60 which may be driven in either direction by power means 62, here shown as a motor 62 and drive connecting means 64, here shown as a chain. Roller 52 is driven by this chain, and this roller, together with roller 50, supports the belt and drives same.

OPERATION

In the operation of one preferred embodiment of the invention, the assembly including the supporting structure 20 and the conveyor 24 is lowered to floor level and transported to the end of the aisle 14 by means of the carriage 10. The load is then placed on the conveyor belt 60 and the carriage 10 is then propelled along the track 12 to the vertical column of bins or storage supports containing the bin or storage support for which the material is intended. The structure 20 is then elevated on the vertical rails 30 until the belt 60 is in the proper vertical relationship and directly opposite both laterally and longitudinally of the storage support or 34 (here selected as the location for the material to be placed). This position 60 is slightly below the supporting surface of the bin 34. The actuating means 50 is then energized, pushing the links 26 and 28 so as to move the conveyor laterally to a position adjacent the bin 34 and vertically to a position just above the bin support 34. The motor 62 is then energized. This motor drives the belt conveyor in a direction to place the material onto the supports of the bin 34. The conveyor assembly is then retracted by actuating the drive 50 to return the assembly to position shown in FIG. 3. The carrier is then ready to go to another bin or to the end of the aisle to receive another load.

When it is desired to remove the material from the bin, the carriage structure 10 is placed in the identical position that it was for placing the material in the bin and the actuator 50 is then energized which will push the conveyor assembly laterally to a position under the material to be removed and vertically to a position where it moves the material just off the supports of the bin 34. The motor 62 is then energized in the reverse direction to pull the material out of the bin back onto the conveyor 60. When this material is entirely supported by the conveyor, the actuator 50 is then moved in the opposite direction to retract and lower the conveyor to place it in the position illustrated in FIG. 3. The load is then entirely supported by the carrier and may be taken to another bin or to the end of the aisle at floor level to be picked up by a fork truck or other means for further disposal.

I have described the preferred embodiment of the present invention together with its operation in the preferred embodiment.

It will, of course, be understood that various changes may be made in the form, details, arrangements, proportions and operations of the parts of this invention without departing from the scope thereof which consists of the matter shown and described therein and particularly set forth in the appended claim.

I claim:
1. A material handling device for an automatic system comprising:
   a carriage capable of moving horizontally and having a pair of vertical guideways,
   a supporting structure mounted on and movable vertically between said guideways and,
   a material transporting power driven endless belt conveyor,
   two equal length dependent supporting arms directly attached to said supporting structure and to said conveyor to thereby form with said structure and said conveyor a parallelogram linkage to suspend the conveyor and permitting the translational movement of said conveyor in an arc to change the position of said conveyor relative to said supporting structure simultaneously both vertically and horizontally,
   power means connected between said supporting structure and said arms for moving said conveyor translationally with respect to said supporting structure,
   whereby said carriage may be moved horizontally and said supporting structure moved vertically after which said conveyor is moved laterally translationally and then energized to move material horizontally on said conveyor in a direction normal to the pivotal axis of the arms.

References Cited

UNITED STATES PATENTS

| | | | |
|---|---|---|---|
| 1,543,214 | 6/1925 | Luce | 214—730 |
| 2,940,625 | 6/1960 | Holm | 214—730 X |
| 3,181,712 | 5/1965 | Von et al. | 214—6 BA |
| 3,292,804 | 12/1966 | Veneman | 214—730 |
| 3,342,361 | 9/1967 | Melin | 214—730 |

FOREIGN PATENTS

| | | | |
|---|---|---|---|
| 159,032 | 2/1940 | Germany | 198—67 |
| 987,637 | 3/1965 | Great Britain | 214—730 |

GERALD M. FORLENZA, Primary Examiner

R. B. JOHNSON, Assistant Examiner

U.S. Cl. X.R.

214—16.4 A; 198—118